Feb. 25, 1936.  F. W. CALDWELL  2,032,255
PROPELLER
Filed Feb. 13, 1933  2 Sheets-Sheet 1
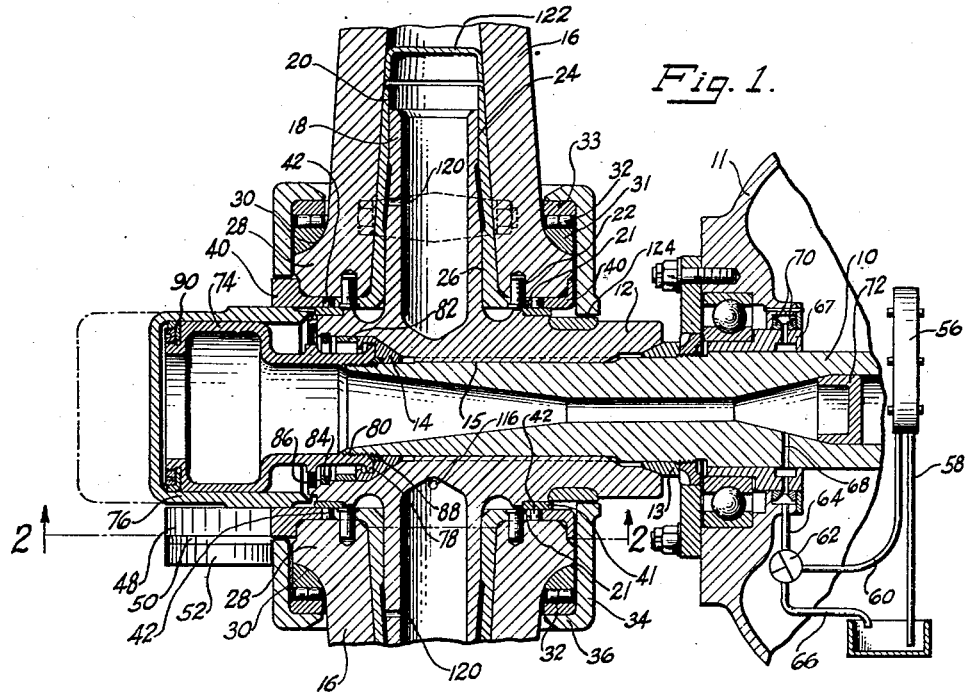
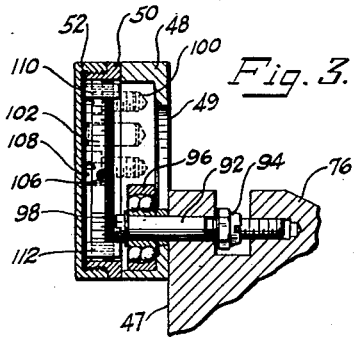
INVENTOR
Frank W. Caldwell
BY
Harris G. Luchor
ATTORNEY Feb. 25, 1936.  F. W. CALDWELL  2,032,255
PROPELLER
Filed Feb. 13, 1933  2 Sheets-Sheet 2
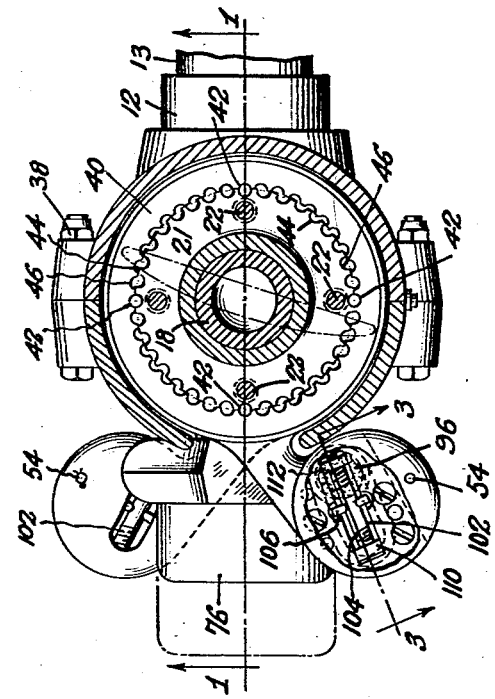
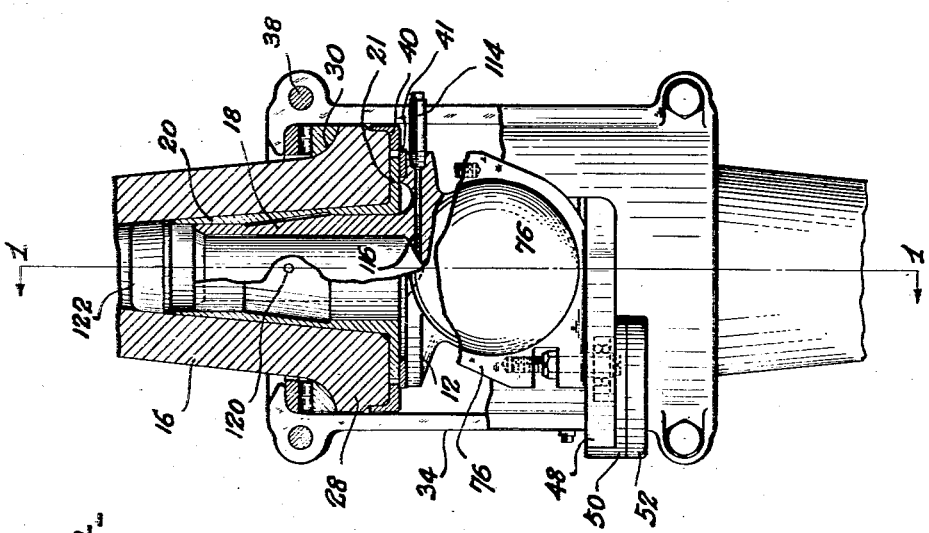
INVENTOR
Frank W. Caldwell
BY
Harris G. Luther
ATTORNEY Patented Feb. 25, 1936

2,032,255

UNITED STATES PATENT OFFICE 2,032,255

PROPELLER

Frank W. Caldwell, West Hartford, Conn., assignor, by mesne assignments, to United Aircraft Corporation, a corporation of Delaware.

Application February 13, 1933, Serial No. 656,533

24 Claims. (Cl. 170—163)

This invention relates generally to propellers for aircraft, and more particularly to mechanism for controlling and changing at will the pitch of the propeller blades while the propeller is operating.

An object of my invention is to provide a propeller for aircraft having simple and compact means for controlling the pitch of the propeller blades during flight of the aircraft.

Another object is to provide a propeller in which although a limited range of pitch control is provided, a selection may be made to provide any desired high or low pitch blade angle.

Still another object of my invention is to provide improved means for backing up the blade ends.

Further and other objects and advantages will be apparent from the specification and claims and from the accompanying drawings which illustrate what is now considered the preferred embodiment.

Fig. 1 is a longitudinal sectional view of a controllable pitch propeller embodying my invention taken on the plane represented by the line 1—1 of Figs. 2 and 4 and showing, partly in section and partly diagrammatically, a fluid pressure control system for operating it.

Fig. 2 is a sectional view taken on planes at right angles to the plane of the section of Fig. 1 and represented by line 2—2 in Fig. 1.

Fig. 3 is a detail of the pin and slot operating mechanism, showing the limits stops for the pitch control.

Fig. 4 is a view partly in section looking at the forward end of the propeller.

The device shown and described in this application is an improvement upon the device shown and described in my co-pending application for patent Ser. No. 531,685, filed April 21, 1931.

Referring to the drawings and more particularly to Fig. 1, a propeller embodying my invention comprises, in general, a hub structure 12 upon which is mounted a plurality of propeller blades 16 extending from the hub 12 in the plane of rotation. The hub in turn is mounted upon a hollow engine shaft 10, which shaft is shown as projecting through crankcase 11. The hub or spider 12 is held in position on the engine shaft 10 by means of centering cones 13 and 14, and prevented from rotating thereon by means of the usual splines 15. The hub 12 is a one piece structure comprising in general a substantially cylindrical body portion from which extend integrally formed arms 18 to constitute a spider having studs upon which the blades 16 are journaled.

The ends of the propeller blades 16 are made hollow and are provided with bushings 20 which are pressed very tightly into the ends of the blades and in addition are held in position by means of pins 22 passing through the flange 21 of the bushing and into the propeller blade so that they in effect become a part of the propeller blade.

The bushing 20 is provided with internal cylindrical bearing surfaces 24 and 26 which snugly engage bearing surfaces on the arms 18 to guide the propeller in its pitch changing movements and to also provide means for transmitting driving force from the engine to the propeller blades and thrust force from the propeller blades to the engine and the aircraft. The blade ends are provided with integral outwardly turned flanges 28 having a large fillet 30, connecting them with the blade shank.

A hub barrel 34 split along the longitudinal center line of the propeller blades encases the blade ends and has integral inturned flanges 36. The hub barrel is held in assembled relation by means of the bolts 38. For holding the blades 16 upon the arms 18, the blades are provided with anti-friction thrust bearings 31, 32 and 33 disposed to encircle the blade shank and also disposed between the out-turned flange 28 of the blade end and the inturned flange 36 of the hub barrel. This hub barrel surrounds the engine shaft 10 and the spider 12 and interconnects the flanges of the several propeller blades 16.

A counter weight bracket 40 is positioned adjacent the end of the blades and surrounding flange 21 of the bushing 20. The portion of this bracket adjacent the flange 21 is provided with forty equally spaced, semi-circular holes, indicated by the reference numeral 44. The outermost edge of flange 21 adjacent the counter weight bracket 40 is provided with thirty-six similar equally spaced, semi-circular holes, indicated by the reference numeral 46. When the bracket 40 is in position, four of the semi-circular holes 44 match up with four of the semi-circular holes 46 so that a pin 42 may be inserted in these matched holes and prevent relative rotation of the bracket and the flange 21. It will thus be apparent that by removing the pins 42 and moving the bracket 40 relative to the flange 21, the bracket may be indexed with respect to the flange in steps of one degree and held in such indexed position by placing the pins 42 in the holes that then register.

In order to assist the arms 18 in transmitting the torque and driving forces to and from the propeller blades 16, an annular bearing surface is provided adjacent the ends of blades 16. In the present embodiment, this annular bearing surface takes the form of an annular ring or shim 41 which is placed in an annular groove in the spider 12 and concentric with and surrounding the arms 18. The innermost face of flange 21 and of counter weight bracket 40 contact with the outer face of this shim so that the shim covers the joint between the flange and the bracket and thereby acts to hold the pins 42 in position. In assembling the propeller, shims of different thicknesses are provided and by selecting a shim of the proper thickness, a tight fit between the blade end and the annular bearing surface, as well as a tight fit between the bearing 31, 32, 33, the inturned hub flanges 36 and the outturned blade flanges 28, is assured. This construction obviates the necessity for extreme accuracy in the machining of the various parts, and thus reduces the cost of manufacture thereof.

The counter weight support 48 is integrally connected with the counter weight bracket, and is adapted to receive counterweight 50 and cap 52. The counter weight 50 is held in position upon the support 48 by means of dowel pins and bolts, and in turn is adapted to have the cap 52 screwed thereon and held in position by the pin 54 passing through the cap and the counter weight, and cotter-pinned into position. Similar counter weights and supports are provided for each propeller blade and from the mechanism thus far described, it is apparent that movement of the counter weights will cause movement of the propeller blades. Due to the centrifugal force created by the rotation of these counter weights with the propeller, they tend to turn the propeller blades upon the arms 18, and thus change the pitch of the propeller. In what is now believed to be the more desirable form, this action of the counter weights under the influence of centrifugal force is used to turn the blades into their high pitch position.

In order to turn the blades into their low pitch position, means have been provided for overcoming the centrifugal action of the counter weights and for moving the counter weights inwardly against such centrifugal force. In the now preferred form, this means takes the form of an oil operated piston and cylinder arrangement operatively connected to the counter weights by means of a pin and slot connection, and actuated by pressure from the oil pump of the engine. The oil pump is shown diagrammatically in Fig. 1, and is indicated by reference numeral 56, and may be the pump now commonly used for supplying lubricating oil to the engine, or it may be any other suitable source of fluid pressure. The pump is provided with an intake 58 and a pressure outlet 60 which is connected with a valve 62. This valve has one outlet 64 adapted to deliver oil under pressure to the interior of the hollow crank shaft and another outlet 66 adapted to discharge into any convenient receptacle which in the preferred embodiment is usually the crank case of the engine. This oil then finds its way back to an oil sump which serves as the oil supply for the pump.

In order to transmit the oil from the stationary outlet 64 into the revolving shaft 10, a collector ring is used. This collector ring comprises a member 67 adapted to rotate with the shaft and having an internal annular groove communicating with radial holes 68 in the engine shaft. Packing rings 70 are fitted on the outside of the member 67, and are encased by the stationary crankcase 11. These packing rings are separated by springs so that they contact with the crankcase and provide a conduit for the oil between them, thus making a fairly oil tight collector ring, but absolute oil tightness is not essential for any oil leakage is drained back into the crankcase.

A plug 72 prevents the passage of oil back toward the engine in the hollow engine shaft so that oil admitted through radial hole 68 is forced to travel through the hollow shaft 10 and into hollow piston 74, creating a pressure which moves cylinder 76 outwardly on this piston 74. As this piston 74 is stationary with respect to shaft 10 and as the cylinder 76 moves with respect thereto, to move the counter weights 50, this piston will be referred to hereinafter as a cylinder guide. The cylinder guide 74 has internal threads 80 adapted to engage with similar external threads on the end of shaft 10 and also has outturned flange 78 which projects into an annular recess in the centering cone 14, so that as the cylinder guide is screwed onto the end of the shaft, it forces the centering cone into position to hold the spider 12 in place, and as it is unscrewed from the end of the shaft, the outturned flange 78 engages the sides of the annular recess in centering cone 14 and pulls it off the shaft. A spacing ring 82 surrounds the end portion of the cylinder guide closely adjacent the inside of spider 12 and a snap ring 84 is set into a recess in the spider 12, so that continued unscrewing of the cylinder guide 74 from the engine shaft 10 will also pull the propeller spider 12 along the engine shaft. In order to hold the cylinder guide 74 in position on the shaft 10 after it has been firmly screwed into position, it is safetied by means of a washer 86 that interlocks with the cylinder guide and the spider 12. It will thus be seen that the cylinder guide serves the double purpose of acting as a guide for the adjusting cylinder as well as the retaining nut for the propeller spider.

In order to prevent oil leakage, a packing member 88 is provided between the centering cone 14 and the cylinder guide 74 and a packing washer 90 is provided between the cylinder guide and the cylinder 76.

The admission of oil under pressure into the hollow cylinder guide and against the cylinder head moves the cylinder outwardly to the dotted line positions shown in Figs. 1 and 2. This motion of the cylinder is communicated to the counter weights and hence to the propeller blades by means of a pin and slot connection shown in Figs. 2 and 3. A pin 92 is threaded into an outstanding lug on cylinder 76, and is locked into position by a lock nut 94. A self-aligning, antifriction bearing 96 is held in position on pin 92 by being clamped between the head 98 of the pin 92 and the cylinder 76, and is adapted to slide in a suitable slot 100 in counter weight support 48. For all working positions, this slot is arranged at an angle with the longitudinal center line of the propeller hub and engine shaft, so that as the cylinder 76 moves along this center line, a turning motion about the arms 18 as a center is imparted to the counter weight supports 48.

It will be noted from Fig. 4 that the centrifugal force acting upon the counter weight 50 is not in a plane normal to the axis of the propeller blade about which the counter weight turns in its pitch adjusting movements. There is, however, a useful component acting in that plane, and the component acting in a plane parallel to the blade axis is absorbed largely by the stiffness of the counter weight bracket 40 which supports the counter weight, and by the equal and opposite forces transmitted through self-aligning bearings 96 to the cylinder 76 by the counter weights of the several blades. The comparatively large area of contact between the surface 47 of the cylinder 76 and the surface 49 of the counter weight bracket 40 and counter weight support 48 effectively prevents any material rotation of the cylinder 76 upon the cylinder guide 74 due to the action of this last mentioned component of the centrifugal force. It will be noted from Fig. 2 that any inertia forces which might be developed in these counter weights acts in the right direction, that is, if the engine tends to suddenly increase its speed, the inertia force of the counter weight, if free to act, would tend to increase the pitch of the blade, and thus oppose the sudden increase in speed.

In order to accurately limit the motion of the cylinder 76 and the upper and lower pitch settings of the propeller blades, a limit stop mechanism is provided. This takes the form of a bolt 102 which is set into a recess 104 in the counter weight 50, which recess is aligned with the slot 100 in the counter weight supports 48. This bolt is prevented from turning and sidewise movement by pin 106 which passes through the bolt and engages in slots 108, and is prevented from longitudinal movement by engagement of the ends of the bolt with the ends of the recess 104. Square nuts 110 and 112 are threaded onto the opposite ends of the bolts and, when in position, are adapted to contact with the head 98 of pin 92, when the cylinder 76 is in its extreme positions. The square nuts are prevented from turning on the bolt, when in operative position, by reason of their close fit in the recess 104. By removing counter weight cap 52 which assists in holding bolt 102 in position, this bolt may be removed and the nuts 110 and 112 moved to a different position thereon. The position of nuts 110 will determine the low pitch position of the blades and the position of nuts 112 will determine the high pitch position of the blades by their contact with head 98.

An oil connection 114 is provided in the spider 12 by means of which oil may be introduced through oil hole 116 into the interior of the hollow arm 18 and through hole 120 to the bearing surfaces 24 and 26 to lubricate them. Plug 122 prevents the oil from passing along inside the hollow propeller blades.

The slot 100 in which the anti-friction bearing 96 operates is in reality a cam, in that it is not a straight slot but is curved longitudinally. It is apparent that, the slot being in a part that travels about a center, as the slot changes its position, its inclination to the longitudinal center line of the propeller hub and engine shaft also changes, which in turn causes a change in the twisting moment capable of being exerted by the cylinder on the blade. It is also apparent that as the slot changes its position the counter weights also change their position and consequently their effective centrifugal force. Due to the fact that the slot is curved, it is possible, as has been done in the embodiment disclosed in the drawings, to have the slot so shaped that the net resultant force available to turn the blades in either direction about the arms 18, is substantially constant for all positions of the slot. This feature is of marked importance, as it allows the use of parts much smaller than might otherwise be required as there is no point where the effective leverage is so small that the parts must be designed to produce a larger force to create a sufficient twisting moment to satisfactorily operate the blades.

The valve 62 may be an ordinary three-way valve adapted in one position to connect the conduit 60 with the conduit 64 to deliver oil under pressure to the blade actuating cylinder 76. In another position, the valve is adapted to connect conduit 64 with conduit 66 to allow the oil to drain from cylinder 76 as the counter weights force the cylinder 76 toward the cylinder guide 74.

A split ring 124, composed of two semi-circular parts, is placed in a groove on the spider 12 in such a position that it is between the spider and the hub barrel. This strip is formed of a laminated phenolic condensation product or any other suitable material and serves as a chafing strip to prevent wear that might otherwise take place due to the slight movement and the consequent rubbing between the hub barrel and the spider, during the operation of the propeller.

The anti-friction bearing member has balls or rollers held in a retaining member to keep them properly spaced. In the mechanism shown the retainer is split and composed of two semi-circular members so that the anti-friction members may be placed in position after the blade and flange are formed but the rings 31 and 33 are each of a single piece and are placed in position before completion of the blade.

Although I have described in detail certain specific embodiments of my invention, it is to be understood that the particular structures shown and the descriptions thereof are for the purpose only of disclosing complete and workable apparatus, and it will be obvious to others skilled in the art that various modifications in the details of construction of the propeller and particularly in the auxiliary devices, as valves, may be made without departing from the spirit and scope of the invention defined in the appended claims.

What I claim is:

1. In a propeller having blades journaled for pitch-adjusting movement, pitch adjusting means, comprising a fluid pressure operated cylinder, pins projecting from said cylinder, arms secured to the propeller blades, said arms having cam surfaces arranged at an angle to the longitudinal axis of said cylinder and adapted to coact with said pins whereby movement of the cylinder will cause movement of said blades and adjustable stops independent of said cam surfaces arranged adjacent the end of said cam surfaces to limit the movement of said pin.

2. In a propeller having blades journaled for pitch-adjusting movement, pitch adjusting means, comprising a fluid pressure operated cylinder, pins projecting from said cylinder, arms secured to the propeller blades, said arms having slots arranged at an angle to the longitudinal axis of said cylinder and adapted to receive said pins whereby movement of the cylinder will cause movement of said blades and adjustable stops arranged in said slots to limit the movement of said pins, each stop comprising a threaded bar, means to prevent longitudinal and rotative movement of said bar, nuts adjustably arranged on the threaded portion of the bar and projecting into said slot to contact with said pins to limit their movement.

3. A controllable pitch propeller, comprising a hub portion, blades journaled on the hub, counter weights adjustably secured to said blades to turn them in one direction under the influence of centrifugal force, a fluid pressure actuated cylinder and means comprising a pin and cam slot connecting the cylinder to the counter weights to overcome the action of centrifugal force thereon to turn the blades in the other direction.

4. A controllable pitch propeller comprising a hub, blades journaled with respect thereto for pitch adjusting movement, arms mounted on the blades and extending laterally therefrom and having slots adjacent the outer end thereof, counter weights secured to the arms adjacent the slots to turn the blades in one direction under the influence of centrifugal force and means adapted to engage with the sides of the slots to move the blades in the other direction.

5. A controllable pitch propeller comprising a hub portion having radial arms, said arms being hollow, a propeller blade journaled on said arm and having internal bearing surfaces cooperating with external bearing surfaces on said arm and conduit means leading from the outside of said hub to the interior of the hollow arm whereby the hollow arm may be filled with lubricant to lubricate the bearing surfaces.

6. In combination with a propeller blade having an arm secured thereto and extending laterally thereof, a counter weight secured to said arm adjacent the end removed from said blade axis, said counter weight adapted to receive covers of various weights whereby the effective weight of the counter weight may be varied.

7. In a propeller, in combination, a hub having arms projecting therefrom, blades journaled on said arms, thrust bearings mounted on said blades, a hub barrel surrounding said blades and having a flange adapted to receive the thrust transmitted by the thrust bearing, annular bearing surfaces on said hub concentric with said arms and adjacent the ends of said blades to assist in resisting the tendency of the blades to bend said arms, an adjustable arm adjacent said blade end, pins for holding said arm in adjusted position, and a removable collar between said pins and said annular bearing surface to hold said pins in position and said blade in close relation with said thrust bearing.

8. A propeller blade comprising a shank portion and an outturned flange adjacent the shank portion, the outside of the blade between the shank and the flange consisting of a fillet.

9. In a propeller the combination of a hub, a hub barrel surrounding the hub, and a chafing strip between the hub and the hub barrel.

10. A controllable pitch propeller for aircraft comprising a hub structure, blades rotatably mounted on the hub, counter weights secured to the blades and movable therewith, means movable transversely of the axis of the blades and connected therewith to move the blades for pitch changing adjustment, pins and cams connecting said means with the blades and adapted to convert a substantially constant force on said means into a force to neutralize the centrifugal force of said weights due to their position and a substantially constant torque on said blades throughout the range of movement of the blades and the weights.

11. Propeller control mechanism comprising pivotally mounted propeller blades and means for moving said blades about their pivots comprising a hydraulically operated cylinder movable along an axis substantially transverse to the axis of the blades and connected by means of pin and cam connections with means secured to the propeller blades to move the blades, hydraulic means for moving the cylinder in one direction only and means actuated by centrifugal force for moving the cylinder in the other direction only.

12. Propeller control mechanism comprising pivotally mounted propeller blades and means for moving said blades about their pivots comprising a hydraulically operated cylinder movable along an axis substantially transverse to the axis of the blades and connected by means of pin and cam connections with means secured to the propeller blades to move the blades, a source of continuous positive fluid pressure, a conduit for conveying fluid to the interior of said cylinder, a drain, and a valve for connecting said conduit at will with either the source of fluid pressure or the drain.

13. A controllable pitch propeller, comprising a hub portion, blades journaled on the hub, counterweights adjustably secured to the blades to turn them in one direction under the influence of centrifugal force, a fluid pressure actuated cylinder and means comprising a pin and cam connecting the cylinder to the blades to overcome the action of centrifugal force and turn the blades in the other direction.

14. In combination, a propeller blade, an arm having an annular aperture therein, a projection on the end of said blade adapted to fit said aperture, series of indentations in the periphery of said projection and in the boundary of said aperture in said arm, said indentations arranged in the manner of a vernier, an annular bearing for the end of said blade and means adapted to be inserted in registering indentations in said projection and said arm to prevent relative movement of said arm and said blade, said means being located between the end of the blade, and said annular bearing.

15. A propeller blade comprising a shank portion, an outturned flange adjacent said shank portion adapted to transmit centrifugal forces developed in said blade to an annular thrust bearing adjacent said flange, the outside of said blade between the shank and the flange consisting substantially entirely of a fillet on which said thrust bearing is adapted to seat.

16. A controllable pitch propeller for aircraft, comprising a hub structure, blades rotatably mounted on the hub, counterweights secured to the blades and movable therewith, means movable transversely of the axis of the blades and connected therewith to move the blades for pitch changing adjustment, pins and cams connecting said means with the blades, the effective acute angle between the operating portion of the cam and the line of travel of the pin increasing substantially inversely as a function of the increase of centrifugal force due to the position of the counterweight and substantially directly as a function of the increase in distance of the pin from the propeller blade axis.

17. A controllable pitch propeller for aircraft, comprising a hub structure, blades rotatably mounted on the hub, counterweights secured to the blades for moving them in one direction, means movable transversely of the blades for moving them in the other direction, means for applying a force to said means, pin and cam connections between said movable means and said blades, said connection providing a variable ratio between the movement of said movable means and the movement of said blade, said ratio decreasing as the centrifugal force due to the position of the counterweights decreases whereby a substantially constant force applied to said movable means will produce a substantially constant turning moment on said blades.

18. A controllable pitch propeller for aircraft, comprising a hub structure, blades rotatably mounted on the hub, weights secured to the blades and adapted to move the blades in one direction under the influence of centrifugal force for pitch changing adjustment, means connected by pin and cam connections with the blades for moving them in the other direction for pitch changing adjustment.

19. A controllable pitch propeller for aircraft, comprising a hub structure, blades rotatably mounted on the hub, weights secured to the blades and adapted to turn the blades in one direction under the influence of centrifugal force, means to turn the blades in the other direction for pitch changing adjustment while in flight and means for converting a substantially constant force applied to said turning means into a substantially constant turning moment for turning said blades and a force to neutralize the centrifugal force of the weights due to their position, comprising a pin and cam connection between said turning means and said blades.

20. A propeller blade comprising a shank portion, an outturned flange adjacent said shank portion, the outside of the blade between the shank and the flange consisting substantially entirely of a fillet, a thrust bearing having a curved face adjacent the fillet and substantially conforming thereto, said face forming substantially the entire bearing surface between the blade and the thrust bearing.

21. A propeller blade comprising a shank portion, an outturned flange adjacent said shank portion, and a thrust bearing located adjacent the flange and having a curved face adapted to seat on a fillet provided on the outside of the blade between the shank and the periphery of the flange.

22. A propeller blade according to claim 21 in which the thrust bearing is an endless ring adapted to restrain expansion of said curved face while under load.

23. In a propeller, in combination, a hub having arms projecting therefrom, blades journalled on said arms, thrust bearing mounted on said blades, a hub barrel surrounding said blades and having a flange adapted to receive the thrust transmitted by the thrust bearing, annular bearing surface on said hub concentric with said arms and adjacent the ends of said blades to assist in resisting the tendency of the blades to bend said arms, an adjustable arm adjacent said blade end and a removable collar between said adjustable arm and said annular bearing surface to hold said arm in position, and said blade in close relation with said thrust bearing.

24. A controllable pitch propeller for aircraft comprising a hub structure, blades rotatably mounted relative to the hub, said blades being adapted to be moved for pitch changing adjustment in one direction by centrifugal force, means movable transversely to the axis of the blades and connected therewith to move the blades for pitch changing adjustment in the other direction, pins and cams connecting said means with the blades and adapted to convert a substantially constant force on said means into a force to neutralize said centrifugal force, and a substantially constant torque on said blades throughout the range of movement of the blades.

FRANK W. CALDWELL.